B. EITNER.
METHOD OF MAKING CAGES FOR ANTIFRICTION BEARINGS.
APPLICATION FILED NOV. 7, 1908.
1,002,244.
Patented Sept. 5, 1911.
2 SHEETS—SHEET 1.
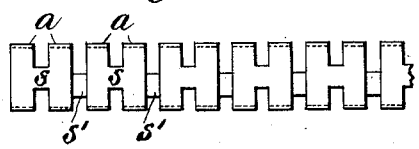
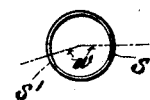
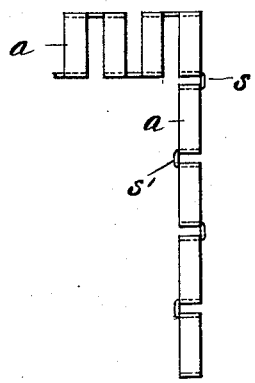
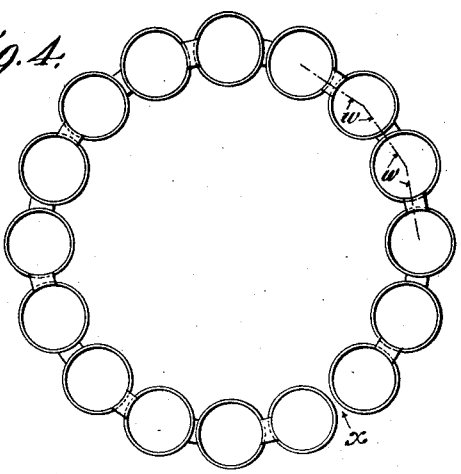
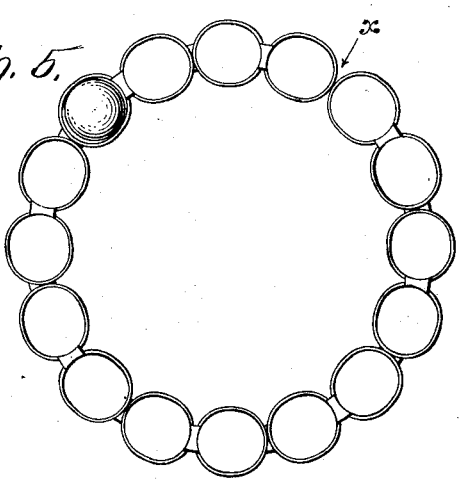
Witnesses:
Inventor
Berthold Eitner
By his Attorney B. EITNER.
METHOD OF MAKING CAGES FOR ANTIFRICTION BEARINGS.
APPLICATION FILED NOV. 7, 1908.
1,002,244.
Patented Sept. 5, 1911.
2 SHEETS—SHEET 2.
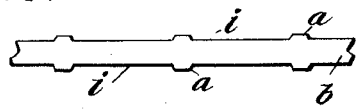
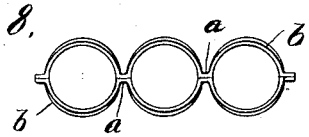
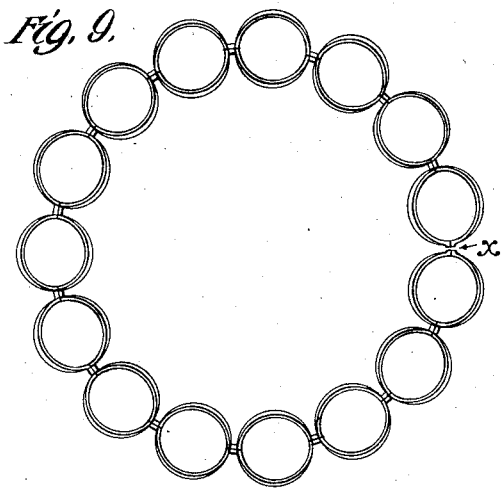
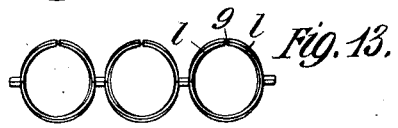
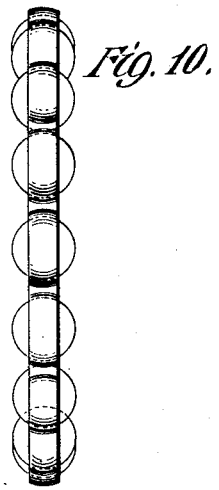
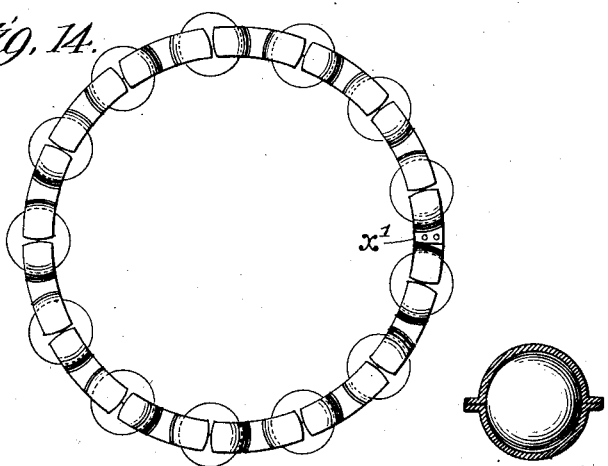
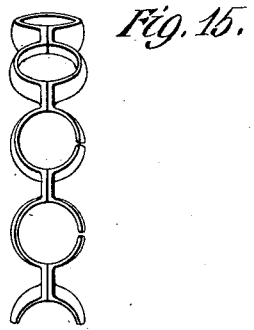

UNITED STATES PATENT OFFICE.

BERTHOLD EITNER, OF BERLIN, GERMANY.

METHOD OF MAKING CAGES FOR ANTIFRICTION-BEARINGS.

1,002,244. Specification of Letters Patent. Patented Sept. 5, 1911.

Application filed November 7, 1908. Serial No. 461,565.

*To all whom it may concern:*

Be it known that I, BERTHOLD EITNER, a subject of the Emperor of Germany, residing at Berlin, in the Empire of Germany, have invented certain new and useful Improvements in Methods of Making Cages for Antifriction-Bearings, of which the following is a specification, reference being had therein to the accompanying drawing.

My invention relates to a method of making cages for anti-friction bearings from tubular or similar material, which consists broadly of the following steps: First, forming in said material the receptacles for the rolling members, and second, altering its shape to conform substantially to that of the casing elements, so that it may be received between them in the manner well known in the art. More specifically, the tube or similar material is cut away so as to leave the openings or receptacles which are formed to adapt themselves to the shape of the balls or other rolling elements, these receptacles being connected to each other in series by strips or transverse portions extending from one receptacle to the next. These connecting strips are then bent or inclined so as to cause the cage to assume circular form, thus conforming it to the shape of the raceway and of the casing elements, between which it is intended to operate.

The tubular or similar material employed has preferably thin walls of tough and flexible material and a diameter which is substantially that of the balls. The cage constructed therefrom fully meets and satisfies the technical and economical requirements of anti-friction bearings. Not only does it sufficiently surround and hold the balls against displacement, but affords the maximum amount of exposure of the ball surfaces for bearing purposes. Again, it is simple, has little weight, and occupies but little space in the bearing. The method may be applied to cages for both thrust and radial bearings, and several forms in which it may be applied are herein described and illustrated.

Referring to the drawings: Figures 1, 2, 3, 4, 5 and 6, illustrate the different steps and features of my invention as applied in the construction of cages for thrust bearings; Figs. 7, 8, 9, 10 and 11, similarly illustrate another form thereof, also employed in connection with the manufacture of cages for thrust bearings; and Figs. 12, 13, 14 and 15, show its application to a construction of cages for radial bearings.

Referring first to Figs. 1 to 6, inclusive, the tube is first cut or notched so as to form rings $a$, $a$, and these rings are left alternately connected by transverse portions or strips $s$, $s$, and $s^1$, $s^1$, respectively, at the front and rear. As is shown in Fig. 2, the strips $s$, $s$, and $s^1$, $s^1$, are not located diametrically opposite to each other, but at an angle represented at $w$, for a reason that will subsequently appear. The material as thus prepared, preferably by means of a mandrel inserted through the rings $a$, $a$, is alternately bent or inclined to the right and left at an angle of 180°, in such a way that the diameter of the rings is perpendicular to the axis of the original tube, as shown in Fig. 3. Due to the fact that the strips $s$, and $s^1$, as previously described, are angularly arranged with respect to each other, and that their angle $w$ is equal to the polygonal angle shown in Fig. 4, the alternate bending of the rings automatically and accurately adjusts them into the desired circular form there shown. The diameter of the tube, and hence of the rings formed therefrom, is somewhat greater than that of the balls to be contained therein, and after the introduction of the balls the rings may be inclined by any suitable means, such as dies and the like, so as to conform partially to the spherical configuration of the balls and thereby hold them in operative position, at the same time permitting their necessary freedom of movement. In thrust bearings of the type wherein such a cage would be employed, in order to obtain the best results and to permit the balls within limits to seek the path of least resistance, some slight freedom of play and automatic radial adjustment is desirable, and this is provided for in the present instance by the fact that the ends of the cages are not connected, as shown at $x$ in Figs. 4 and 5, which permits the necessary freedom of adjustment. In other words, the balls are held by the cages in such manner that while normally positioned so as to sustain the load, they are nevertheless free to adapt themselves to slightly variant conditions. Figs. 5 and 6 show the finished cage made in accordance with this exemplification of my improved method.

Figs. 7, 8, 9, 10 and 11 illustrate another form of my invention, and one similarly employed for the production of cages for thrust bearings. In this the tube is first placed under pressure and flattened so as to bring its opposite sides together. It is then cut away at intervals, as shown at $i, i$, in Fig. 7, the connecting portions $a, a$, being left, as in the previous instance. The material thus formed is then treated so as to produce the ball receiving receptacles, the sides of which are widened and molded transversely as by a mandrel, so that the balls may be introduced therein. The sides $b, b$, of these receptacles are then suitably acted upon, as by dies or the like, so as to cause them to conform to the shape of the balls, (see Fig. 8), so as to retain them in the manner previously described. The cage containing the balls is then bent into circular form, so that it may be inserted between the casing elements, as shown in Figs. 9 and 10. The principal distinction between this embodiment of the method and that previously described, is that the rings or ball receptacles are here originally formed in the tube in a position at right-angles to that of the former embodiment, and therefore the direct bending of the material into circular form is resorted to. As in the previous case, the ends of the prepared strips are not joined, see the point $x$ in Fig. 9, and as a result thereof, the same capability for lateral adjustment exists. If desired, these ends may be united in any desired manner, as by rivets, solder, or the like, as shown for instance at $x^1$, Fig. 14, but in this event slightly greater latitude must be permitted to the balls within the cage, as shown for instance in exaggerated form in Fig. 11.

A third form of applying my invention is shown in Figs. 12, 13, 14 and 15, which is designed to produce cages for radial bearings, as distinguished from the thrust bearing cages previously referred to. The tube is again flattened and portions thereof cut away in the manner previously described in connection with Fig. 7, and the ball receptacles are formed and shaped in substantially the same way, with the exception, however, that one side of the ring is cut through and the two severed portions $l, l$, are then bent outwardly, as indicated in Fig. 12. The cage is then located in proper position between the casing elements of the radial bearing and the balls placed in proper position within their respective receptacles in the manner well understood, after which the flaps $l, l,$ are turned over the balls, as at $g$, Fig. 13, so as to retain them in position. Figs. 14 and 15 illustrate, respectively, the finished cage with the balls therein, and the cage without the balls.

Obviously many different modes of carrying the invention into effect are possible, and I desire it to be understood that the invention is not limited to any specific form except in so far as such limitations are specified in the claims.

Having thus described my invention, what I claim and desire to secure by Letters-Patent of the United States is as follows:

1. The method of making an integral cage for anti-friction bearings including the following steps: notching tubular or circumferentially continuous material to form therein receptacles for the rolling members and at the same time to leave connecting portions from one receptacle to the next, and then bending these connecting portions to conform its shape substantially to that of the raceway in the casing elements.

2. The method of making an integral cage for anti-friction bearings including the following steps: notching tubular or circumferentially continuous material to form therein receptacles for the rolling members and at the same time to leave connecting portions from one receptacle to the next alternately at opposite sides, which connecting portions are also angularly arranged with relation to each other, and then bending these connecting portions transversely and alternately in opposite directions so as to conform its shape substantially to that of the raceway in the casing elements.

In testimony whereof I affix my signature in presence of two witnesses.

BERTHOLD EITNER.

Witnesses:
   Henry Hasper,
   Woldemar Haupt.

---

Copies of this patent may be obtained for five cents each, by addressing the "Commissioner of Patents, Washington, D. C."